(12) United States Patent
Kasztenny et al.

(10) Patent No.: US 10,522,995 B2
(45) Date of Patent: Dec. 31, 2019

(54) OVERCURRENT ELEMENT IN TIME DOMAIN

(71) Applicant: Schweitzer Engineering Laboratories, Inc., Pullman, WA (US)

(72) Inventors: Bogdan Z. Kasztenny, Markham (CA); Mangapathirao Venkata Mynam, Pullman, WA (US); Armando Guzman-Casillas, Pullman, WA (US); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 326 days.

(21) Appl. No.: 15/622,006

(22) Filed: Jun. 13, 2017

(65) Prior Publication Data
US 2017/0358913 A1 Dec. 14, 2017

Related U.S. Application Data

(60) Provisional application No. 62/349,520, filed on Jun. 13, 2016.

(51) Int. Cl.
*H02H 3/02* (2006.01)
*H02H 3/30* (2006.01)
(Continued)

(52) U.S. Cl.
CPC ............ *H02H 3/02* (2013.01); *H02H 1/0007* (2013.01); *H02H 3/30* (2013.01); *H02H 7/26* (2013.01);
(Continued)

(58) Field of Classification Search
CPC ............ H02H 3/02; H02H 3/30; H02H 7/265; H02H 7/26; H02H 7/263; H02H 1/0007; H02H 1/0084
See application file for complete search history.

(56) References Cited

U.S. PATENT DOCUMENTS 3,585,298 A   6/1971  Liberman
3,670,240 A   6/1972  Maranchak
(Continued)

FOREIGN PATENT DOCUMENTS

EP   226210   12/1986
EP   241832   7/1990
(Continued)

OTHER PUBLICATIONS

Harshad Mehta, Fault Location Techniques for High-Voltage DC Lines, EPRI EL-4331 Project 2150-1, 1985.
(Continued)

*Primary Examiner* — Nathan Milakovich
(74) *Attorney, Agent, or Firm* — Jared L. Cherry; Richard M. Edge (57) ABSTRACT

The present disclosure pertains to systems and methods for supervising protective elements in electric power systems. In one embodiment, a system may be configured to selectively enable a protective action an electric power system. The system may include a data acquisition subsystem receive a plurality of representations of electrical conditions associated with at least a portion of the electric power delivery system. An incremental quantities module may calculate incremental quantities from the plurality of representations. The system may be configured to detect an event, to determine an incremental quantities value during the event, and to determine a time-varying threshold. The incremental quantities value during the event may be compared with the time-varying threshold, and a protective action module may be enabled to implement a protective action when the value of the incremental quantities value during the event exceeds the time-varying threshold.

9 Claims, 9 Drawing Sheets

US 10,522,995 B2
Page 2

(51) Int. Cl.
*H02H 7/26* (2006.01)
*H02H 1/00* (2006.01)

(52) U.S. Cl.
CPC ............ *H02H 7/263* (2013.01); *H02H 7/265* (2013.01); *H02H 1/0084* (2013.01)

(56) References Cited

U.S. PATENT DOCUMENTS

| | | | |
|---|---|---|---|
| 3,878,460 A | 4/1975 | Nimmersjö | |
| 3,890,544 A | 6/1975 | Chamia | |
| 3,956,671 A | 5/1976 | Nimmersjö | |
| 4,053,816 A | 10/1977 | Nimmersjö | |
| 4,063,163 A * | 12/1977 | Vitins | G01R 31/085 324/522 |
| 4,063,164 A * | 12/1977 | Lanz | G01R 31/021 324/522 |
| 4,254,444 A | 3/1981 | Eriksson | |
| 4,296,452 A | 10/1981 | Eriksson | |
| 4,344,142 A | 8/1982 | Diehr | |
| 4,351,011 A | 9/1982 | Liberman | |
| 4,377,834 A | 3/1983 | Eriksson | |
| 4,450,497 A * | 5/1984 | Bignell | H02H 7/265 361/80 |
| 4,499,417 A | 2/1985 | Wright | |
| 4,626,772 A | 12/1986 | Michel | |
| 4,766,549 A | 8/1988 | Schweitzer | |
| 4,797,805 A | 1/1989 | Nimmersjö | |
| 4,800,509 A | 1/1989 | Nimmersjö | |
| 5,198,746 A | 3/1993 | Gyugyi | |
| 5,446,387 A | 8/1995 | Eriksson | |
| 5,572,138 A | 11/1996 | Nimmersjö | |
| 5,682,100 A | 10/1997 | Rossi | |
| 5,729,144 A | 3/1998 | Cummins | |
| 6,341,055 B1 | 1/2002 | Guzman-Casillas | |
| 6,417,791 B1 * | 7/2002 | Benmouyal | H02H 1/0092 341/111 |
| 6,477,475 B1 | 11/2002 | Takaoka | |
| 6,597,180 B1 | 7/2003 | Takaoka | |
| 6,798,211 B1 | 9/2004 | Rockwell | |
| 7,174,261 B2 | 2/2007 | Gunn | |
| 7,535,233 B2 | 5/2009 | Kojovic | |
| 7,714,735 B2 | 5/2010 | Rockwell | |
| 7,733,094 B2 | 6/2010 | Bright | |
| 8,315,827 B2 | 11/2012 | Faybisovich | |
| 8,525,522 B2 | 9/2013 | Gong | |
| 8,598,887 B2 | 12/2013 | Bjorklund | |
| 8,655,609 B2 | 2/2014 | Schweitzer | |
| 8,781,766 B2 | 7/2014 | Schweitzer | |
| 8,990,036 B1 | 3/2015 | Schweitzer | |
| 9,470,748 B2 | 10/2016 | Schweitzer | |
| 9,594,112 B2 | 3/2017 | Schweitzer | |
| 9,627,881 B2 | 4/2017 | Schweitzer | |
| 10,090,664 B2 * | 10/2018 | Schweitzer, III | H04B 3/46 |
| 10,236,675 B2 * | 3/2019 | Schweitzer, III | H02H 7/265 |
| 10,310,005 B2 * | 6/2019 | Schweitzer, III | G01R 31/11 |
| 10,375,108 B2 * | 8/2019 | Schweitzer, III | H04L 63/1466 |
| 10,422,827 B2 * | 9/2019 | Schweitzer, III | H02H 1/0007 |
| 2001/0012984 A1 | 8/2001 | Adamiak | |
| 2002/0165462 A1 | 11/2002 | Westbrook | |
| 2004/0189317 A1 | 9/2004 | Borchert | |
| 2004/0230387 A1 | 11/2004 | Bechhoefer | |
| 2005/0151659 A1 | 7/2005 | Donovan | |
| 2006/0012374 A1 | 1/2006 | Kojovic | |
| 2008/0077336 A1 | 3/2008 | Fernandes | |
| 2009/0230974 A1 | 9/2009 | Kojovic | |
| 2011/0058285 A1 | 3/2011 | Wibben | |
| 2011/0173496 A1 | 7/2011 | Hosek | |
| 2011/0264388 A1 | 10/2011 | Gong | |
| 2012/0086459 A1 | 4/2012 | Kim | |
| 2013/0021039 A1 | 1/2013 | Bjorklund | |
| 2013/0096854 A1 | 4/2013 | Schweitzer | |
| 2013/0100564 A1 | 4/2013 | Zhang | |
| 2013/0241622 A1 * | 9/2013 | Zerbe | G11C 7/02 327/323 |
| 2014/0074414 A1 | 3/2014 | Schweitzer, III | |
| 2016/0077149 A1 * | 3/2016 | Schweitzer, III | G01R 31/2836 307/131 |
| 2016/0077150 A1 | 3/2016 | Schweitzer | |
| 2016/0084893 A1 | 3/2016 | Schweitzer | |
| 2017/0012424 A1 | 1/2017 | Schweitzer | |
| 2017/0082675 A1 * | 3/2017 | Schweitzer, III | H04B 3/46 |
| 2017/0146613 A1 | 5/2017 | Schweitzer | |
| 2017/0336444 A1 * | 11/2017 | Sela | G01R 31/02 |
| 2018/0210060 A1 * | 7/2018 | Guzman-Casillas | G01R 35/00 |

FOREIGN PATENT DOCUMENTS

| | | |
|---|---|---|
| EP | 164711 | 12/1991 |
| EP | 244649 | 4/1992 |
| EP | 627085 | 12/2005 |
| GB | 1463755 | 2/1977 |
| WO | 9519060 | 7/1995 |
| WO | 2007135073 | 11/2007 |
| WO | 2010099585 | 9/2010 |
| WO | 2013119315 | 8/2013 |

OTHER PUBLICATIONS

Masaoki Ando, Edmund O. Schweitzer III, R. A. Baker, Development and Field-Data Evaluation of Single-End Fault Locator for Two-Terminal HVDC Transmission Lines, IEEE Transactions on Power Apparatus and Systems, vol. PAS-104, No. 12, 1985.

Masaoki Ando, Fault Location Techniques for HVDC Lines: Analysis, Development, Simulation, and Field-Data Evaluation, 1984.

P.F. Gale, Overhead Line Fault Location Based on Travelling Waves & GPS, 1993.

Harry Lee, Development of an Accurate Transmission Line Fault Locator Using the Glabal Positioning System and Satellites, 1994.

Hewlett Packard, Traveling Wave Fault Location in Power Transmission Systems, Application Note 1285, 1997.

Michael A. Street, Delivery and Application of Precise Timing for a Traveling Wave Powerline Fault Locator System, 1990.

Sergio Luiz Zimath, Marco Antonio Ramos, Jayme Silva Filho, Joaquim Moutinho Beck, Nei Mueller, Traveling Wave-Based Fault Location Experiences, 2010.

Qualitrol Corporation, Telefault TWS Traveling Wave Fault Locator, Qualitrol Brochure 2004.

PCT/US2012/060089 Patent Cooperation Treaty, International Search Report and Written Opinion of the International Searching Authority, dated Feb. 5, 2013.

Elhaffar, Power Transmission Line Fault Location Based on Current Traveling Waves. TKK Dissertations 107, Espoo 2008, Helsinki University of Technology. Department of Electrical Engineering, Dec. 2008.

Reason International, Inc., Traveling Wave Fault Location in Power Transmission Systems, White Paper.

Carlos Alberto Dutra, Rafael Rosar Matos, Sergio Luiz Zimath, Jurandir Paz De Oliveira, Joao Henrique Monteiro De Resende, Joaquim Americo Pinto Moutinho, Fault Location by Traveling Waves: Application in High Impedance Events.

N. Fischer, V. Skendzic, R. Moxley, J. Needs, Protective Relay Traveling Wave Fault Location, Feb. 9, 2012.

PCT/US2014/055894 Patent Cooperation Treaty, International Search Report and Written Opinion of the International Searching Authority, dated Dec. 17, 2014.

PCT/US2014/055896 Patent Cooperation Treaty, International Search Report and Written Opinion of the International Searching Authority, dated Dec. 18, 2014.

PCT/US2014/055919 Patent Cooperation Treaty, International Search Report and Written Opinion of the International Searching Authority, dated Dec. 22, 2014.

(56) References Cited

OTHER PUBLICATIONS

Borghetti, et al, "On the use of continuous-wavelet transform for fault location in distribution power systems." International Journal of Electrical Power & Energy Systems. Nov. 2006.

Maher M.I. Hashim, Hew Wooi Ping, V.K. Ramachandaramurthy, Impedance-Based Fault Location Techniques for Transmission Lines, Sep. 2009.

Zheng et al., Study on Impedance-Traveling Wave Assembled Algorithm in One-Terminal Fault Location System for Transmission Lines, Apr. 2008.

Gabriel Benmouyal, Karl Zimmerman, Experience With Subcycle Operating Time Distance Elements in Transmission Line Digital Relays, Presented at the 37th Annual Western Protective Relay Conference Oct. 2010.

Edmund O. Schweitzer, III, Armando Guzman-Casillas, Mangapathirao Venkat Mynam, Veselin Skendzic, Bogdan Kasztenny, Stephen Marx, Locating Faults by the Traveling Waves They Launch, Feb. 10, 2014.

Toshio Tahagi, Jun-Ichi Baba, Katauhiko Usmura, Tishiaki Sakaguchi, Fault Protection Based on Travelling Wave Theory—Part I Theory, Jan. 24, 1977.

PCT/US2015/050504 Patent Cooperation Treaty, International Search Report and Written Opinion of the International Searching Authority, dated Jan. 29, 2016.

He, Baina, Yunwei Zhao, and Hengxu Ha. "A Novel Wave Based Differential Protection for Distributed Parameter Line." Telkomnika Indonesian Journal of Electrical Engineering TELKOMNIKA 11.9 (2013): 5097-104.

Tang, Lanxi; Dong, Xinzhou; Shi, Shenxing; Wang, Bin; "Travelling Wave Differential Protection Based on Equivalent Travelling Wave", 13th IET International Conference on Developments in Power System Protection (DPSP 2016), Mar. 7-10, 2016.

PCT/US2016/052329 Patent Cooperation Treaty, International Search Report and Written Opinion of the International Searching Authority, dated Jan. 6, 2017.

PCT/US2017/037345 Patent Cooperation Treaty, International Search Report and Written Opinion of the International Searching Authority, dated Aug. 24, 2017.

PCT/US2017/037288 Patent Cooperation Treaty, International Search Report and Written Opinion of the International Searching Authority, dated Aug. 28, 2017.

\* cited by examiner

OVERCURRENT ELEMENT IN TIME DOMAIN

RELATED APPLICATION

This application claims priority under 35 U.S.C. § 119(e) to U.S. Provisional Patent Application No. 62/349,520, filed Jun. 13, 2016, titled "OVERCURRENT ELEMENT IN A TIME DOMAIN," which is hereby incorporated by reference in its entirety.

TECHNICAL FIELD

This disclosure relates to systems and methods for supervising protective elements in electric power systems. More particularly, but not exclusively, this disclosure relates to overcurrent protection or overcurrent supervision in electric power systems using incremental quantities.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Faster transmission line protection improves power system stability. If faults are not cleared before the critical fault clearing time, the system may lose transient stability and possibly suffer a blackout. In addition, faster fault clearing increases the amount of power that can be transferred through lines that are not limited by thermal constraints. Faster protection also enhances public and utility personnel safety, limits equipment wear, improves power quality, and reduces damage due to fault energy.

Ultra high-speed fault detection techniques using traveling waves and/or incremental quantities improve the speed of protective actions. Power system conditions, such as, series capacitor switching, lightning strikes to the ground wires that couple energy to the power conductors, general switching events, and the like, may exhibit some characteristics that may be mistaken for a fault. Misidentification of one of these events as a fault may result in an unnecessary protective action. Ultra high-speed fault detection techniques using traveling waves and or incremental quantities should include necessary supervision to identify these events for security.

Various embodiments consistent with the present disclosure include a supervision element to improve the identification of faults and to restrain the operation of protective actions in response to other types of events (e.g., switching events). Incremental currents near and/or slightly above the fundamental frequency component may be used in embodiments by the supervision element.

High-speed detection systems consistent with the present disclosure may seek to balance the concerns of speed and certainty or security. Various embodiments consistent with the present disclosure may utilize a time-varying threshold that is responsive to current in the system. In some embodiments, the time-varying threshold may be based on incremental current values.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
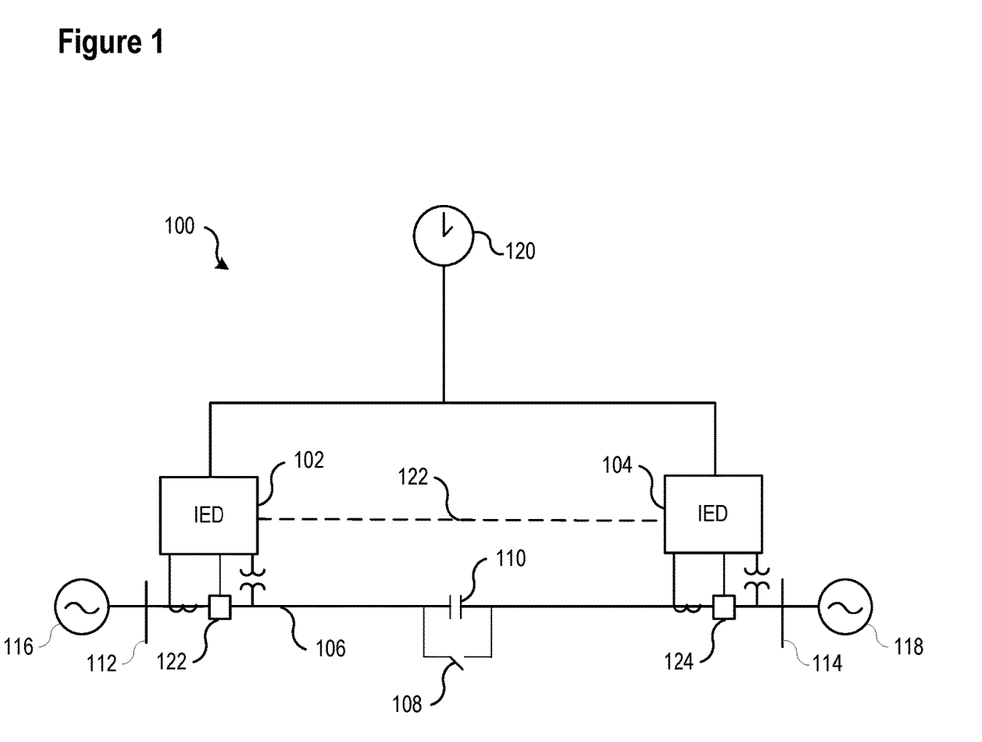
FIG. 1 illustrates a line protection application consistent with embodiments of the present disclosure.

FIG. 1 illustrates a block diagram of a system 100 for detecting and calculating a location of a fault using time-domain principles and elements further described herein. System 100 may include generation, transmission, distribution and/or similar systems. System 100 includes a conductor 106 such as a transmission line connecting two nodes, which are illustrated as a local terminal 112 and a remote terminal 114. A series capacitor 110 is included on conductor 106. A switch 108 may be used to bypass the series capacitor 110. Local and remote terminals 112 and 114 may be buses in a transmission system supplied by generators 116 and 118, respectively. Although illustrated in single-line form for purposes of simplicity, system 100 may be a multi-phase system, such as a three-phase electric power delivery system.

System 100 is monitored by Intelligent Electronic Devices (IEDs) 102 and 104 at two locations of the system, although further IEDs may also be utilized to monitor further locations of the system. As used herein, an IED (such as IEDs 102 and 104) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. IEDs 102 and 104 may obtain electric power system information using current transformers (CTs), potential transformers (PTs), Rogowski coils, voltage dividers and/or the like. IEDs 102, 104 may be capable of using inputs from conventional instrument transformers such as CTs and PTs conventionally used in monitoring of electric power delivery. IEDs may not need to use a common time source to provide protection according to several of the embodiments herein. In other embodiments IEDs 102 and 104 may receive common time information from a common time source 120. Common time source 120 may be any time source capable of delivering a common time signal to each of IEDs 102 and 104, including, for example, a Global Navigational Satellite System (GNSS) such as the Global Positioning System (GPS) delivering a time signal corresponding with IRIG, a WWVB or WWV system, a network-based system, such as the IEEE 1588 precision time protocol, and/or the like.

A data communication channel 122 may allow IEDs 102 and 104 to exchange information relating to, among other things, voltages, currents, time-domain fault detection and location. According to some embodiments, a time signal based on common time source 120 or based on a time source internal to either IED 102 or IED 104 may be distributed using data communication channel 122. Data communication channel 122 may be embodied in a variety of media and may utilize a variety of communication protocols. For example, data communication channel 122 may be embodied utilizing physical media, such as fiber optics. Further, data communication channel 122 may utilize communication protocols such as Ethernet, SONET, SDH, or the like, in order to communicate data.

A variety of conditions may occur on conductor 106. A fault on transmission conductor 106 may launch traveling waves that may be detected by IEDs 102 and 104. In response to a fault, IEDs 102 and 104 may actuate breakers 122 and 124, respectively, respectively to interrupt the flow of current through conductor 106 until the conditions causing the fault can be addressed. In addition to faults, however, other events in system 100 may also generate traveling waves and incremental voltage or current change. For example, traveling waves, or incremental voltage and current change may be generated by switching capacitor 110 in or out of system 100. A protective action scheme implemented by IEDs 102 and 104 needs to differentiate between a fault, which should result in a protective action being taken, and a switching event associated with capacitor 110, which should not result in a protective action being taken. Various systems and methods disclosed herein may be used, for example, to supervise time-domain protection elements that may protect against faults on conductor 106. The supervisory element may selectively enable the time-domain protection elements to interrupt electrical current flowing through conductor 106 based on a time-varying threshold established consistent with the present disclosure.

In one specific scenario, the supervisory element may be configured to provide an adaptive overcurrent threshold to provide both sensitivity and security on a series compensated transmission line, such as conductor 106. More specifically, the expected voltage and current changes associated with a switching event may be determined and a threshold may be selected based on the expected voltage and current changes to ensure that a switching event associated with a series compensated line is not mistaken for a fault.

Still further, the loading of the line may be determined and used to adjust a security margin. In some embodiments, security margin may be scaled by a function dependent on line loading and/or line parameters. In this way, the security margin may be lower when the line is lightly loaded, and be higher when the line is heavily loaded. In one embodiment, the security margin may be a user-selected value that is high enough to exceed incremental current caused by capacitor switching. Such a system enables sensitivity to faults of different magnitude based on the electrical conditions in an electric power system when the faults occur and still be secure under switching events.

Figure 2A:
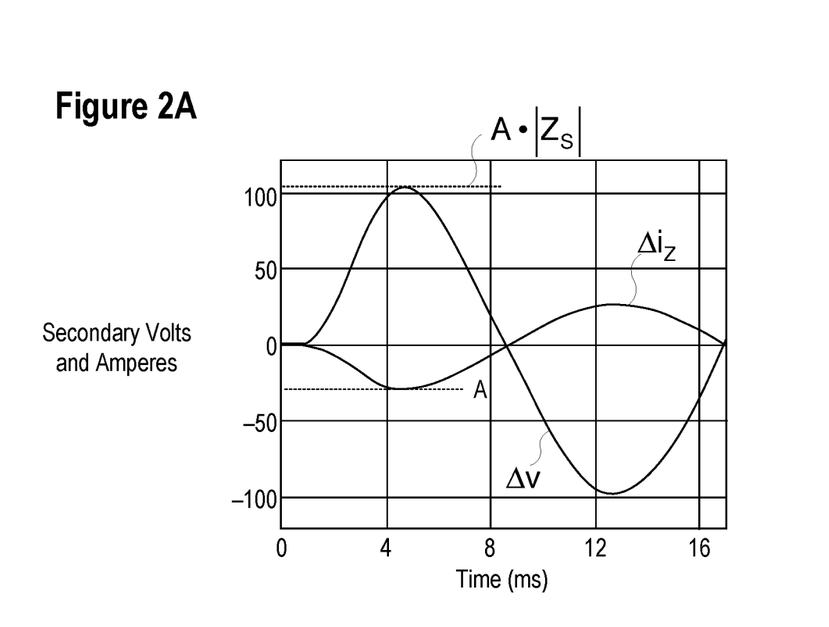
FIG. 2A illustrates a plot over time of the incremental voltage and incremental replica current for a forward fault consistent with embodiments of the present disclosure.
Figure 2B:
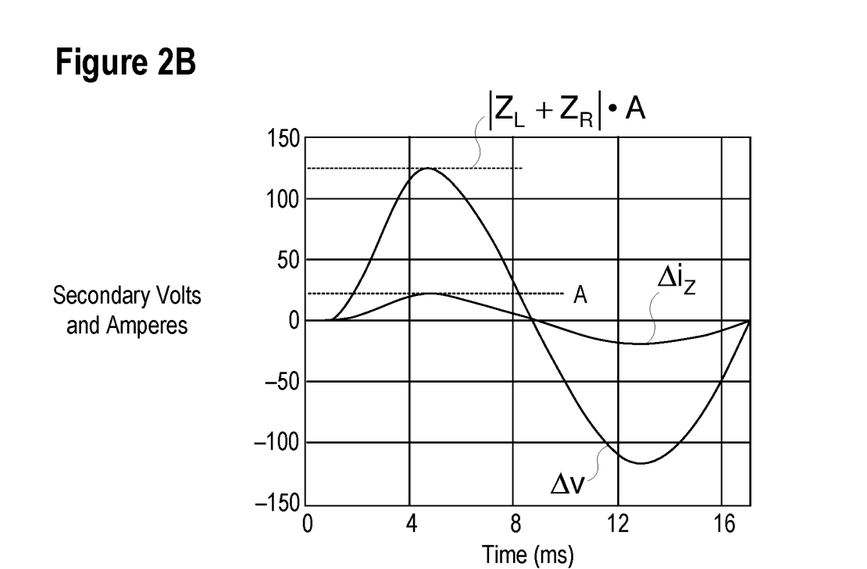
FIG. 2B illustrates a plot over time of the incremental voltage and incremental replica current for a reverse fault consistent with embodiments of the present disclosure.

FIG. 2A illustrates a plot over time of the incremental voltage ($\Delta v$) and incremental replica current ($\Delta i_Z$) for a system event in the forward direction consistent with embodiments of the present disclosure. Similarly, FIG. 2B illustrates a plot over time of the incremental voltage and incremental replica current for a reverse fault consistent with embodiments of the present disclosure. FIG. 2A and FIG. 2B illustrate that the incremental replica currents have similar waveforms as the incremental voltages and the relative polarities between the incremental voltages and the replica incremental currents may be used to indicate fault direction. Specifically, where the polarity of $\Delta v$ is opposite of the polarity of $\Delta i_Z$, as in FIG. 2A, the fault may be a forward fault; and where the polarity of $\Delta v$ is the same as the polarity of $\Delta i_Z$, as in FIG. 2B, the fault may be a reverse fault. More specifically, the incremental signals are caused by any sudden change in voltage, not only a fault. Therefore, we may refer to a forward or reverse event rather than a forward or reverse fault. Further, the amplitude relationship between incremental voltage and incremental replica current depends on the system parameters and the fault direction. The peak amplitude of the incremental voltage equals $|Z_S|$ times the peak amplitude of the incremental replica current for forward faults, and it equals $|Z_L+Z_R|$ times the peak amplitude of the incremental replica current for reverse faults.

Because traveling wave fault detection methods and fault detection using incremental quantities, such as those described in US Patent Application Publication numbers 2016/0077149 and 2016/0077150, may be capable of ultra high-speed fault detection, supervision of such fault detection techniques adds security to the fault detection and power system protection system. Overcurrent supervision may be used to inhibit protective operations that may have otherwise be taken in response to traveling waves launched by certain events, such as switching events.

Figure 3:
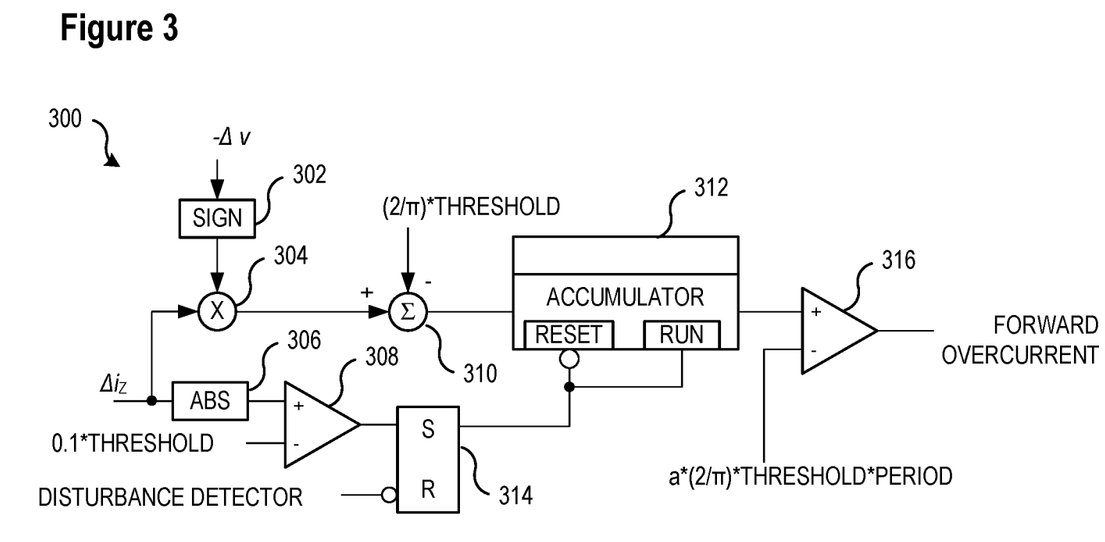
FIG. 3 illustrates a block diagram of a directional overcurrent logic system using incremental quantities consistent with embodiments of the present disclosure.

FIG. 3 illustrates a block diagram of a directional overcurrent logic system 300 using incremental quantities consistent with embodiments of the present disclosure. In various embodiments, system 300 may be used to supervise distance elements (such as, for example TD21 time-domain distance elements), directional elements (such as, for example TD32 time-domain directional elements), and communication based tripping scheme outputs. System 300 receives a loop incremental replica current, ($\Delta i_Z$), loop incremental voltage ($\Delta v$), period, and disturbance detector inputs, as well as a threshold.

The direction of the fault may be determined based on the sign 302 of the loop incremental voltage. The sign 302 of the incremental voltage may be multiplied 304 by the loop incremental replica current. For forward events the current and voltage are of opposite polarities so the product of inverted incremental voltage sign and the incremental replica current is always positive for forward events and negative for reverse events. This way the effective input to the summation block is positive for forward events and negative for reverse events.

The product of the sign of the incremental voltage and the loop incremental replica current may be an input to summation block 310. In the illustrated embodiment, the adder subtracts the value $2\pi$*threshold from the signal. The integration of the constant value $2\pi$*threshold when integrated creates a linear time-varying threshold increasing from 0 to the pickup threshold over the waveform period. The threshold value used in the various embodiments herein may be calculated from a number of device settings; it may be directly provided by the user as a setting, and/or it may be dynamically calculated based on the number of conditions and other setting or factory constants. The output of the summation block 310 may be provided as an input to an accumulator 312.

The accumulator 312 may be selectively enabled using a comparator 308 and set-reset latch 314. The set-reset latch 314 is set and remains latched until a disturbance detector bit is deasserted. In the illustrated embodiment, the set-reset latch 314 is reset-dominant. The set-reset latch 314 may be set when the absolute value 306 of the loop incremental replica current exceeds a small fraction of the threshold. In the illustrated embodiment, the threshold is multiplied by 0.1, but other values may be used. The output of the set-reset latch 314 may be used to selectively accumulate an operating signal toward operating or restraining if the latch is set (i.e., the loop incremental replica current exceeded a selected small fraction of the threshold).

In order for the output of system 300 to be asserted, the difference between the integrated loop incremental replica current and the time-varying threshold must be higher than a certain minimum value. In the illustrated embodiment, the output from the accumulator 312 is compared with a constant value of a*$2\pi$*threshold*period by a comparator 316. The value a may represent a security margin. In one specific embodiment, the security margin may be equal to 0.05. The accumulator 312 may operate on a set of samples, and therefore the security threshold may be adjusted for the number of samples per cycle based on the period of the power system monitored by system 300.

Figure 4:
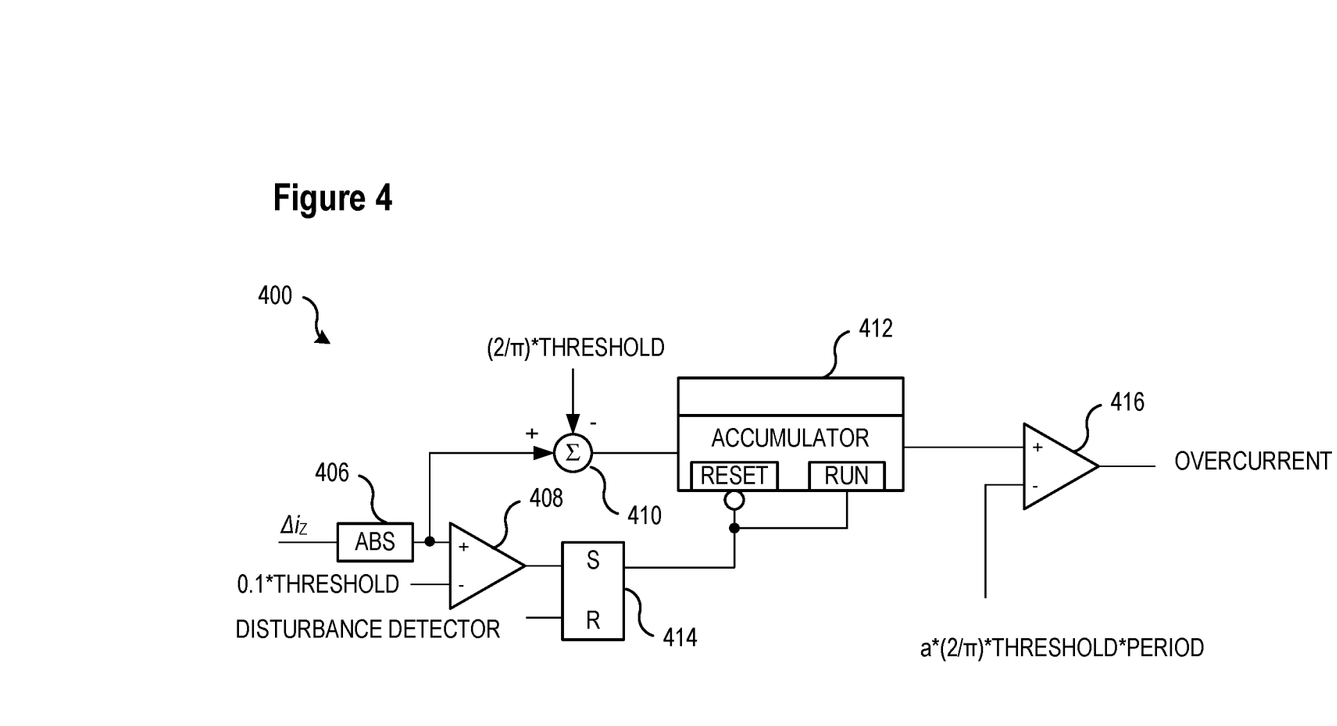
FIG. 4 illustrates a block diagram of a non-directional overcurrent logic system consistent with embodiments of the present disclosure.

FIG. 4 illustrates a block diagram of a non-directional overcurrent logic system 400 consistent with embodiments of the present disclosure. System 400 may be used to supervise distance elements (such as, for example TD21 time-domain distance elements), directional elements (such as, for example TD32 time-domain directional elements), traveling wave elements (such as, for example TW87 traveling wave differential element) and communications based tripping scheme outputs. System 400 receives a loop incremental replica current, ($\Delta i_Z$), period, and disturbance detector inputs, as well as a threshold.

The absolute value 406 of the loop incremental replica current may be an input to a summation block 410. In the illustrated embodiment, the adder subtracts the value $2\pi$*threshold from the signal. The output of the summation block 410 may be provided as an input to an accumulator 412. The accumulator 412 may be selectively enabled using a comparator 408 and set-reset latch 414. The set-reset latch 414 may be set when the absolute value 406 of the loop incremental replica current exceeds a small fraction of the threshold. In the illustrated embodiment, the threshold is multiplied by 0.1, but other values may be used. The output of the set-reset latch 414 may be used to selectively accumulate an operating signal toward operating or restraining if the latch is set (i.e., the loop incremental replica current exceeded a selected small fraction of the threshold).

In order for the output of system 400 to be asserted, the difference between the integrated loop incremental replica current and the time-varying threshold must be higher than a certain minimum value. In the illustrated embodiment, the output from the accumulator 412 is compared with a constant value of a*2π*threshold*period by a comparator 416. The value a may represent a security margin. In one specific embodiment, the security margin may be equal to 0.05. The accumulator 412 may operate on a set of samples, and therefore the security threshold may be adjusted for the number of samples per cycle based on the period of the power system monitored by system 400.

Figure 5A:
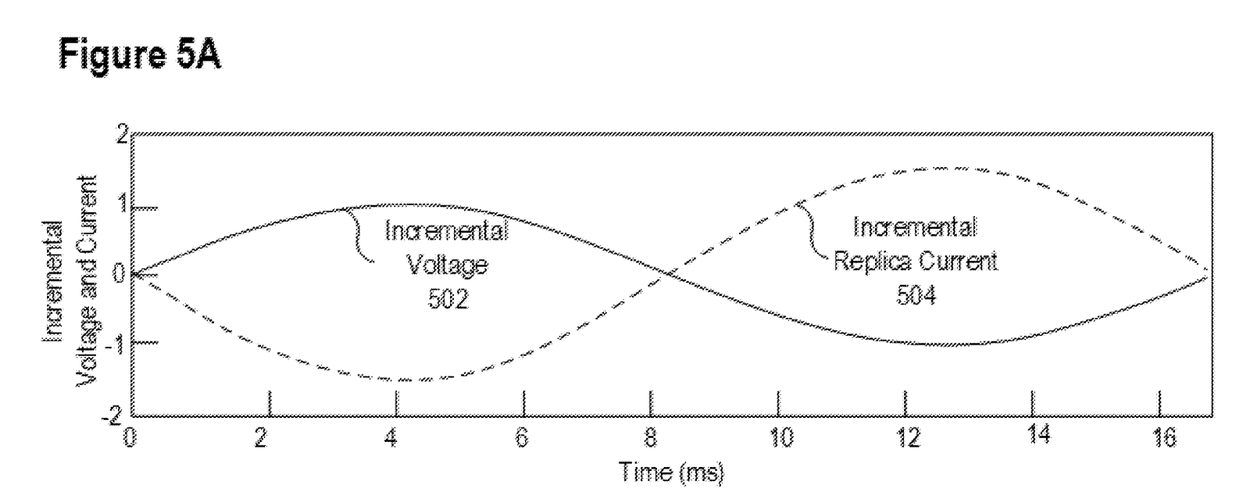
FIG. 5A illustrates a plot over time of an incremental voltage and an incremental current during a power system event in the forward direction consistent with embodiments of the present disclosure.

FIG. 5A illustrates a plot over time of an incremental voltage 502 and an incremental replica current 504 during a power system event in the forward direction consistent with embodiments of the present disclosure. As described above, the directionality of the event may be determined based on the polarities of the incremental voltage 502 and the incremental replica current 504. In the illustrated embodiment, the current and voltage have opposite polarities, which indicate that the event is in the forward direction. The incremental replica current 504 reaches a magnitude of 1.5.

Figure 5B:
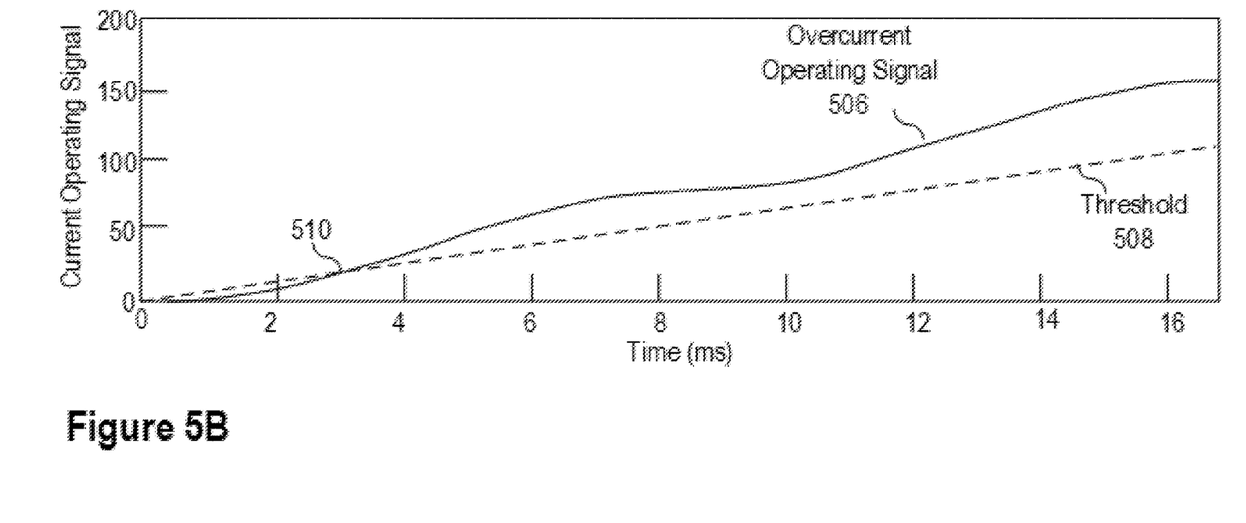
FIG. 5B illustrates a plot over time of an operating signal and a time-varying threshold for a forward event consistent with embodiments of the present disclosure.

FIG. 5B illustrates a plot over time of an operating signal 506 and a time-varying threshold 508 for a forward event consistent with embodiments of the present disclosure. The threshold 508 may represent an integration of the replica incremental current, representative of the threshold. In some embodiments the integration of the replica incremental current may be approximated by a straight line, and the slope of the straight line may be proportional to the magnitude. Accordingly, a larger magnitude of the current corresponds to a threshold having a steeper slope. The overcurrent operating signal 506 may represent the output of accumulator 312 in FIG. 3 or accumulator 412 in FIG. 4.

A supervisory overcurrent system (e.g., system 300 illustrated in FIG. 3 or system 400) may selectively compare the overcurrent operating signal 506 to the threshold 508 and may assert when the overcurrent operating signal exceeds the threshold. In some embodiments, the time-varying threshold may be an integral of a constant value, and accordingly, may result in a linear time-varying threshold. In such embodiments, the linear time-varying threshold 508 may be compared to the overcurrent operating signal 506 by subtracting the two signals. System 300 illustrated in FIG. 3 and system 400 illustrated in FIG. 4 implement such an operation using summation block 310 and summation block 410, respectively.

As illustrated in FIG. 5B, the overcurrent operating signal exceeds the threshold signal at 510 after approximately 3 ms. The overcurrent operating signal 506 and the threshold 508 may be used to differentiate faults from switching events or other conditions in an electric power system. Conditions in which the overcurrent operating signal 506 exceeds the time-varying threshold 508 may correspond to faults, and accordingly, may enable time-domain protective elements to implement a protective action to remedy the overcurrent condition.

Figure 6A:
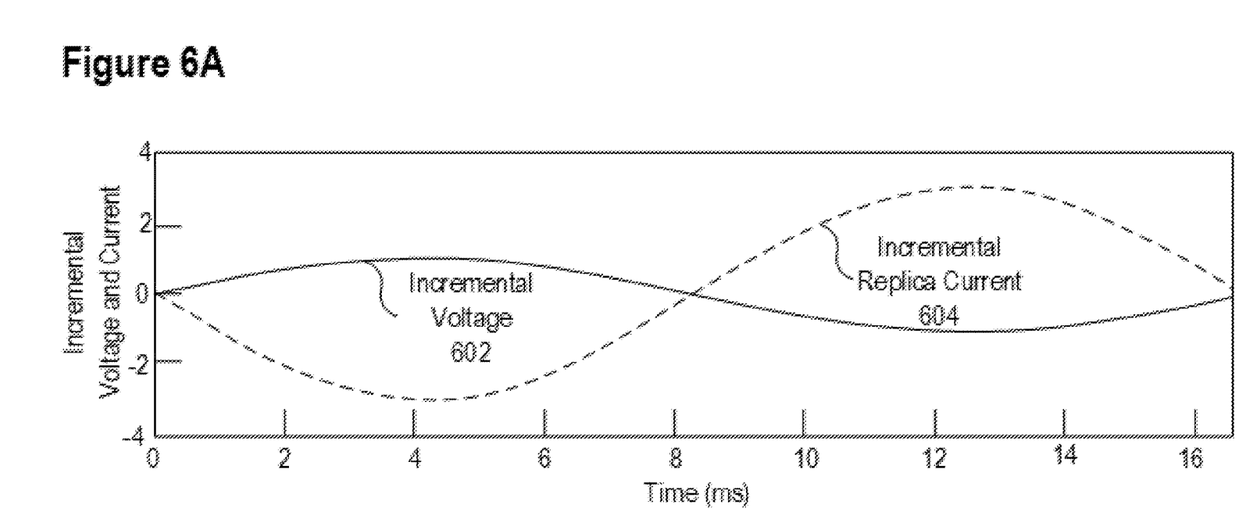
FIG. 6A illustrates a plot over time of an incremental voltage and an incremental current during a power system event in the forward direction consistent with embodiments of the present disclosure.

FIG. 6A illustrates a plot over time of an incremental voltage 602 and an incremental replica current 604 during a power system event in the forward direction consistent with embodiments of the present disclosure. The magnitude of the incremental current reaches a magnitude of 3. The magnitude of the incremental replica current 604 is greater than the magnitude of the incremental replica current 504 illustrated in FIG. 5A.

Figure 6B:
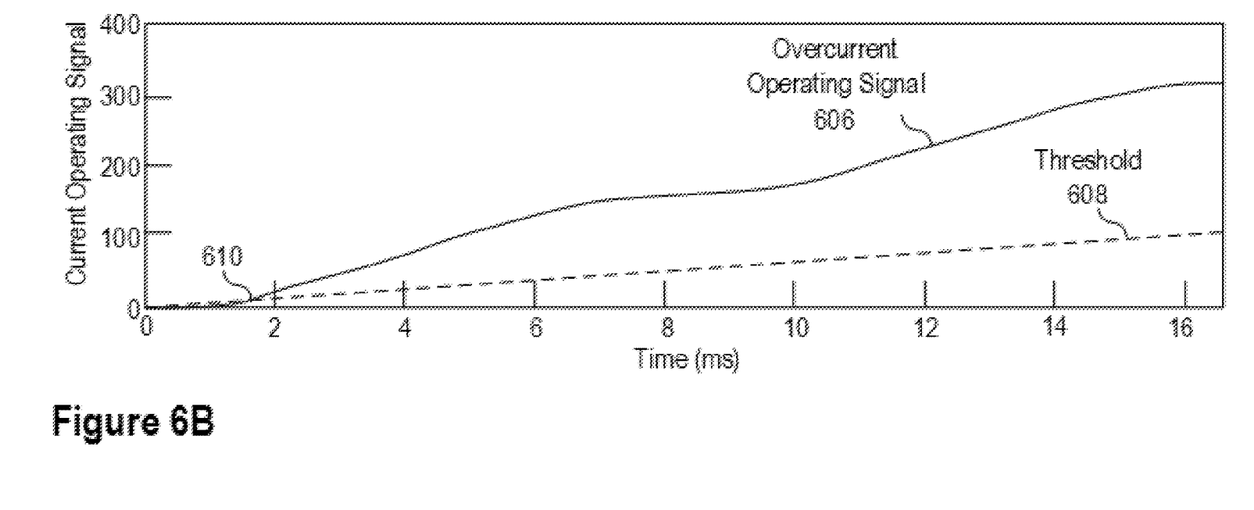
FIG. 6B illustrates a plot over time of an operating signal and a time-varying threshold for a forward event consistent with embodiments of the present disclosure.

FIG. 6B illustrates a plot over time of an operating signal 606 and a time-varying threshold 608 for a forward event consistent with embodiments of the present disclosure. As illustrated, the overcurrent operating signal 606 exceeds the time-varying threshold 608 at 610 after approximately 1.7 ms. In comparison to FIG. 5B, the threshold may be reached more quickly because the magnitude of the incremental current is greater.

Figure 7A:
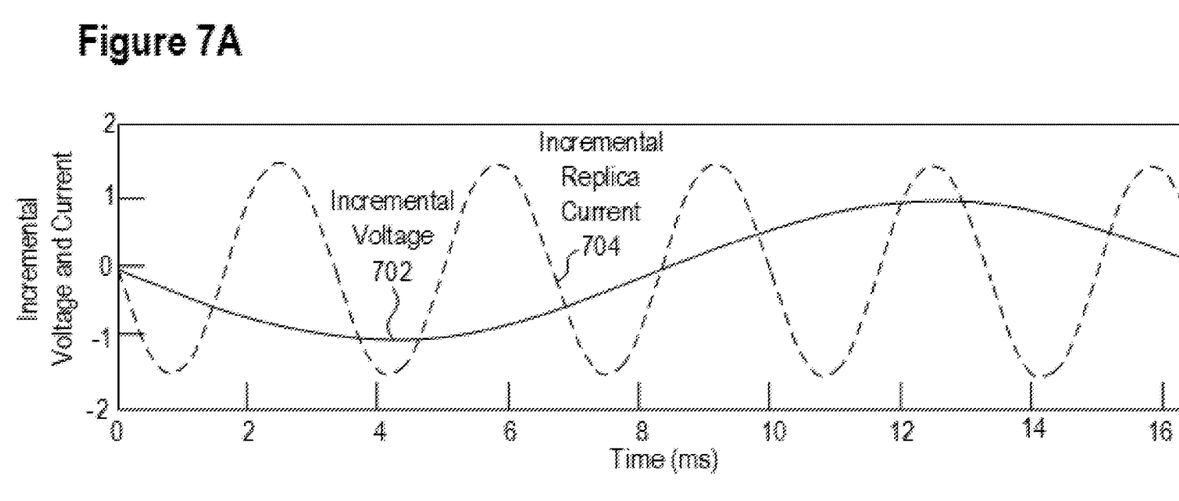
FIG. 7A illustrates a plot over time of an incremental voltage and an incremental current in a case where the replica current is a high frequency signal consistent with embodiments of the present disclosure.

FIG. 7A illustrates a plot over time of an incremental voltage 702 and an incremental replica current 704 in a case where the incremental replica current is a high frequency signal consistent with embodiments of the present disclosure. The high frequency incremental replica current signal may be caused by a line charging current of around 300 Hz for an external fault with a magnitude of 1.5 times the pickup threshold. The fundamental frequency component of the current is exactly zero, meaning this event cannot be classified as forward or reverse. Such conditions may arise from a fault on a parallel line that is placed in such a way that the protected line does not experience any change in current. Given that the fault is on a parallel line, a protective action on the protected line would not resolve the condition. Accordingly, a supervisory system consistent with the present disclosure should restrain (i.e., should not enable a protective action), despite the high magnitude of the charging current.

Figure 7B:
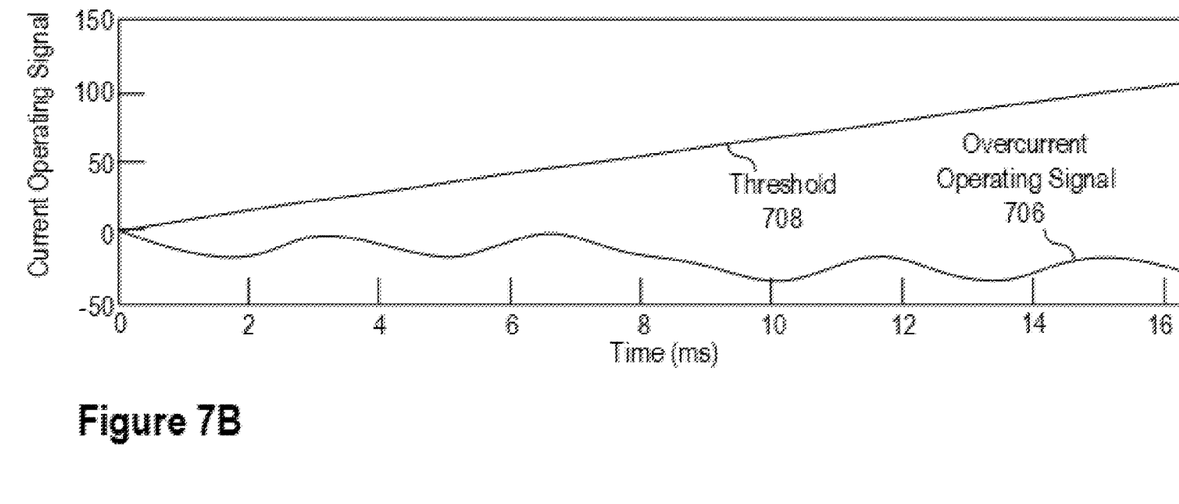
FIG. 7B illustrates a plot over time of an operating signal and a time-varying threshold consistent with embodiments of the present disclosure.

FIG. 7B illustrates a plot over time of an operating signal and a time-varying threshold consistent with embodiments of the present disclosure. As shown, the overcurrent operating signal 706 does not exceed the threshold signal 708. Accordingly, an overcurrent element restrains time-domain protective elements from implementing a protective action on the protected line.

Figure 8:
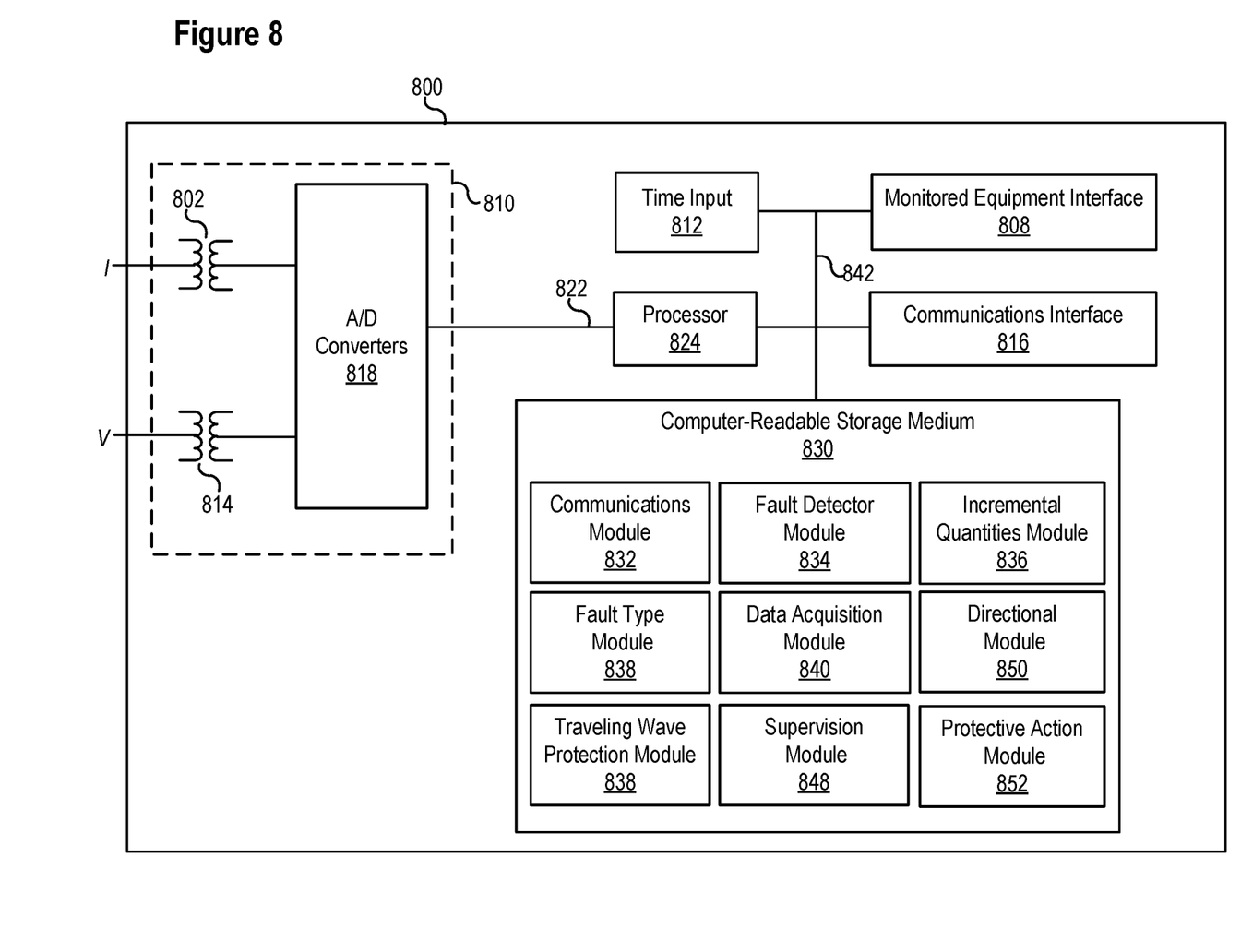
FIG. 8 illustrates a functional block diagram of a system for detecting overcurrent conditions using traveling wave or incremental quantity principles consistent with embodiments of the present disclosure.

FIG. 8 illustrates a functional block diagram of a system 800 for detecting and locating faults using time-domain quantities consistent with embodiments of the present disclosure. In certain embodiments, the system 800 may comprise an IED system configured to, among other things, obtain and calculate time-domain quantities, detect and locate faults using a time-domain distance module, detect and locate faults using a time-domain directional module, and detect and locate faults using traveling waves. System 800 may be implemented using hardware, software, firmware, and/or any combination thereof. In some embodiments, system 800 may be embodied as an IED, while in other embodiments, certain components or functions described herein may be associated with other devices or performed by other devices. The specifically illustrated configuration is merely representative of one embodiment consistent with the present disclosure.

System 800 includes a communications interface 816 configured to communicate with devices and/or IEDs. In certain embodiments, the communications interface 816 may facilitate direct communication with other IEDs or communicate with systems over a communications network. Communications interface 816 may facilitate communications through a network. System 800 may further include a time input 812, which may be used to receive a time signal (e.g., a common time reference) allowing system 800 to apply a time-stamp to the acquired samples. In certain embodiments, a common time reference may be received via communications interface 816, and accordingly, a separate time input may not be required for time-stamping and/or synchronization operations. One such embodiment may employ the IEEE 1588 protocol. A monitored equipment interface 808 may be configured to receive status information from, and issue control instructions to, a piece of monitored equipment (such as a circuit breaker, conductor, transformer, or the like).

Processor 824 may be configured to process communications received via communications interface 816, time input 812, and/or monitored equipment interface 808. Processor 824 may operate using any number of processing rates and architectures. Processor 824 may be configured to perform various algorithms and calculations described herein. Processor 824 may be embodied as a general purpose integrated circuit, an application specific integrated circuit, a field-programmable gate array, and/or any other suitable programmable logic device.

In certain embodiments, system 800 may include a sensor component 810. In the illustrated embodiment, sensor component 810 is configured to gather data directly from conventional electric power system equipment such as a conductor (not shown) using conventional PTs and/or CTs. The sensor component 810 may use, for example, transformers 802 and 814 and A/D converters 818 that may sample and/or digitize filtered waveforms to form corresponding digitized current and voltage signals provided to data bus 822. Current (I) and voltage (V) inputs may be secondary inputs from conventional instrument transformers such as, CTs and VTs. A/D converters 818 may include a single A/D converter or separate A/D converters for each incoming signal. A current signal may include separate current signals from each phase of a three-phase electric power system. A/D converters 818 may be connected to processor 824 by way of data bus 822, through which digitized representations of current and voltage signals may be transmitted to processor 824. In various embodiments, the digitized current and voltage signals may be used to calculate time-domain quantities for the detection and the location of a fault on an electric power system as described herein.

A computer-readable storage medium 830 may be the repository of various software modules configured to perform any of the methods described herein. A data bus 842 may link monitored equipment interface 808, time input 812, communications interface 816, and computer-readable storage medium 830 to processor 824.

Communications module 832 may be configured to allow system 800 to communicate with any of a variety of external devices via communications interface 816. Communications module 832 may be configured for communication using a variety of data communication protocols (e.g., UDP over Ethernet, IEC 61850, etc.).

Data acquisition module 840 may collect data samples such as the current and voltage quantities and the incremental quantities. The data samples may be associated with a timestamp and made available for retrieval and/or transmission to a remote IED via communications interface 816. Traveling waves may be measured and recorded in real-time, since they are transient signals that dissipate rapidly in an electric power delivery system. Data acquisition module 840 may operate in conjunction with fault detector module 834. Data acquisition module 840 may control recording of data used by the fault detector module 834. According to one embodiment, data acquisition module 840 may selectively store and retrieve data and may make the data available for further processing. Such processing may include processing by fault detector module 834, which may be configured to determine the occurrence of a fault with an electric power distribution system.

An incremental quantities module 836 may be configured to calculate time domain incremental quantities based on the techniques disclosed herein. The incremental quantities module 836 may be configured to use digitized representations of current and/or voltage measurements to calculate incremental quantities therefrom. In some embodiments, system 800 may be one of a pair of IEDs in communication with different terminals on an electric power system such as IEDs 102 and 104 illustrated in FIG. 1. In one embodiment, each IED of a pair of IEDs may calculate incremental quantities in its own incremental quantities module 836 for later processing and sharing between the IEDs. In another embodiment, system 800 may receive digitized representations from both the sensor component 810 and from a remote IED via the communications interface 816, and the incremental quantities module 836 may be configured to calculate incremental signals from both sources to calculate both local and remote incremental quantities.

A fault type module 838 may be configured to determine a fault type using incremental quantities from module 836. Fault type module 838 may use the techniques disclosed herein, to determine a fault type and provide the proper incremental quantities to use for other processing within the IED.

Traveling wave protection module 838 may be configured to extract traveling waves from the digitized voltages and current measurements and to determine a protective action to take due to the occurrence of a fault. Traveling wave protection module 838 may be operable in conjunction with the directional module 850 and/or the incremental quantities module 836 to identify traveling waves and to determine whether an event giving rise to traveling waves is a fault. In various embodiments, traveling wave protection module 838 may be configured to use time aligned measurements acquired at various points throughout an electric power system.

A directional module 850 may be configured to determine a direction (forward or reverse) to a fault. The directional module 850 may be configured to use incremental quantities from incremental quantities module 836 to determine a direction to a fault. In other embodiments, directional module 850 may be configured to determine the direction based on the polarity of traveling waves. In such embodiments, the polarities of the voltage and current traveling waves are opposite if the fault is in the forward direction. If the fault is in the reverse direction, the voltage and current traveling waves have the same polarity.

A supervision module 848 may be configured to supervise certain protective actions of other modules, such as the fault detector module 834, traveling wave protection module 838, directional module 850, protection action module 852, and the like. The supervision module 848 may use incremental voltage and/or incremental current quantities from the incremental quantities module 836, and operate according to the various embodiments described herein. The supervision module 848 may allow the protection action module to take a protective action when the integrated supervised quantity exceeds the threshold as described according to the embodiments disclosed herein.

A protective action module 852 may be configured to implement a protective action based on the declaration of a fault by the fault detector module 834. In various embodiments, a protective action may include tripping a breaker, selectively isolating a portion of the electric power system, etc. In various embodiments, the protective action module 852 may coordinate protective actions with other devices in communication with system 800.

In various embodiments system 800 may be configured to provide protection based on instantaneous voltages and currents. Such signal components require shorter data windows but facilitate faster protection. Various embodiments of system 800 may be configured to achieve an operating time of approximately 1 millisecond. Such a system may utilize a lumped parameter circuit-based and TW-based time-domain approach and may allow for versatile applications covering various relay input voltage sources and available communications channels. Such a system may utilize high sampling rates (≥1 MHz), high-resolution (≥16 bits) synchronized sampling, high-fidelity time synchronization, and a communications network capable of exchanging all acquired data (≥100 Mbps), or high numeric burden required by some of the algorithms (≥1 G multiplications per second).

Although several embodiments discussed hereinabove refer to three phases of an alternating-current electric power delivery system, the principles herein may be applied to a multiple-phase alternating-current electric power system having more or less than three phases. For example, a four-phase electric power delivery system is contemplated, as is a six-phase electric power delivery system. The principles taught herein may be applied. In other embodiments, the principles taught may be applied to a direct-current electric power delivery system. In particular, traveling wave detection using currents only in a traveling wave differential module may use current quantities from a direct-current electric power delivery system to detect faults and take control actions thereon.

Various setting strategies are contemplated for the threshold settings for the setting utilized in various embodiments disclosed herein. In one particular embodiment, a time-domain distance element may use incremental voltage calculated for the reach point as an operating signal. This operating signal may be selective if there is a measurable difference between the voltage at the reach point and voltage at the remote bus. The overcurrent element describe herein can be used to supervise the distance element.

Figure 9:
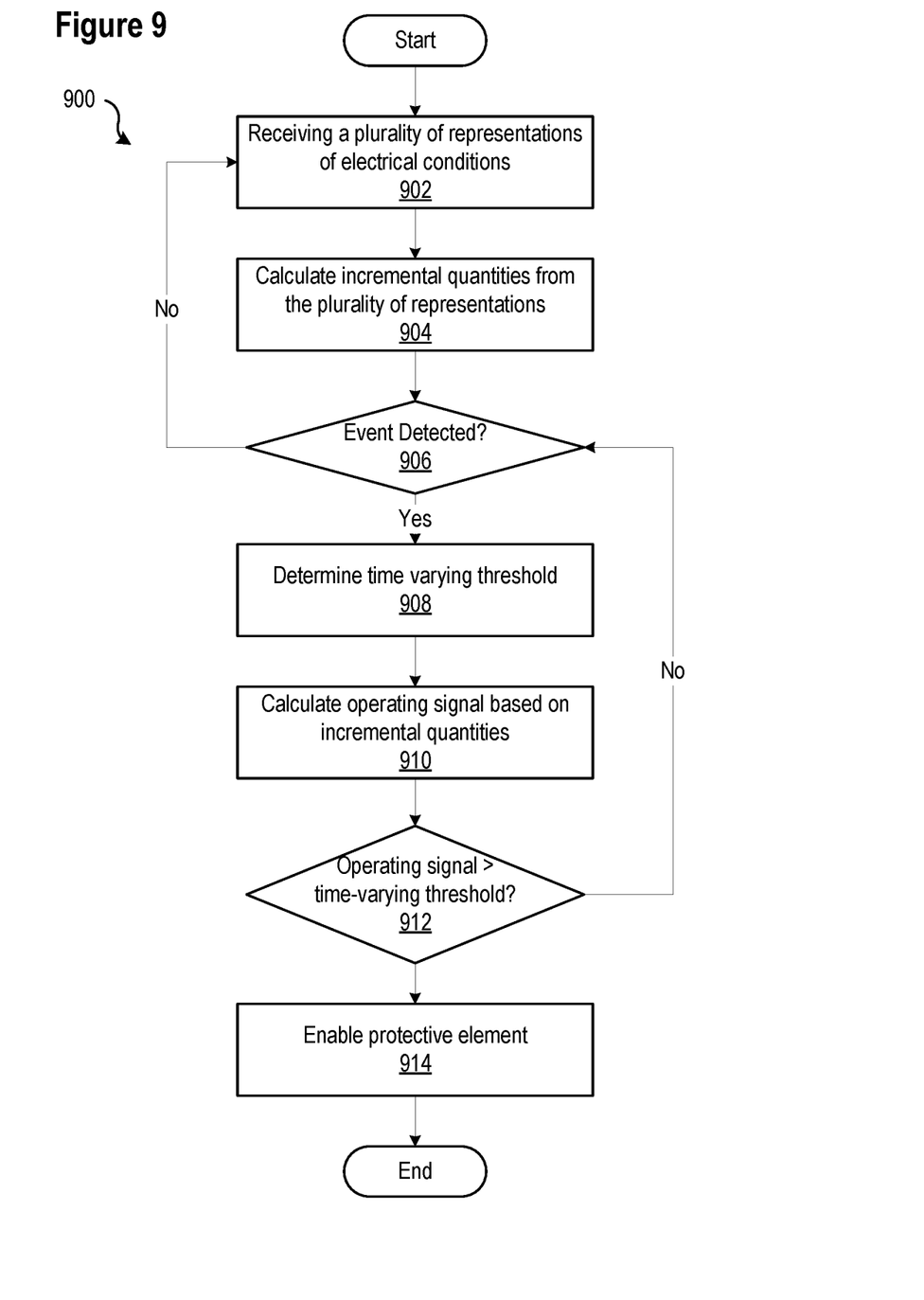
FIG. 9 illustrates a flow chart of a method for using incremental quantities to supervise an overcurrent element consistent with embodiments of the present disclosure.

FIG. 9 illustrates a flow chart of a method 900 for using incremental quantities to develop an overcurrent element consistent with embodiments of the present disclosure. At 902, a plurality of representations of electrical conditions in an electric power system may be received. In various embodiments, the representations of electrical conditions may comprise voltage and/or current measurements from one or more nodes in the electric power system. At 904, the plurality of representations of electrical conditions may be used to calculate incremental voltage and/or incremental current quantities.

At 906, method 900 may determine if an event is detected. Various techniques may be utilized to detect events in an electric power system. In some embodiments, traveling waves may be used to detect events. If no event is detected, method 900 may return to 902. If an event is detected, method 900 may proceed to determine whether to enable a protective element. The protective element may be enabled when the event corresponds to a condition that may be ameliorated by a protective action taken by the protective element (e.g., a fault in the forward direction may be cleared by enabling an overcurrent protection element). Otherwise, the protective element may be restrained from implementing a protective action (e.g., the protective element may be restrained where the element corresponds to a switching event).

At 908, a time-varying threshold may be determined. In some embodiments, the time-varying threshold may be proportional to the magnitude of the electrical parameters. For example, the threshold associated with a transmission line may be increased at a time when the magnitude of the current is higher. In some embodiments, the threshold may comprise a security margin that allows the threshold to be customized for a particular system. For example, the security margin may be determined based on an expected worst scenario for a particular event (e.g., switching a capacitor bank on a series compensated transmission line). An appropriate security margin may ensure that a protective element is restrained from implementing a protective action in response to events that may occur in routine operation of the electric power system.

At 910, an operating signal may be calculated based on the incremental quantities. In some embodiments, the operating signal may be determined by integrating a difference between a loop incremental replica current and the time-varying threshold.

At 912, the operating signal and the time-varying threshold may be compared to determine if the operating signal exceeds the time-varying threshold. If the operating signal does not exceed the time-varying threshold, method 900 may return to 906. Elements 908, 910, and 912 may be repeated while the event is detected. If the operating signal exceeds the time-varying threshold, a protective element may be enabled at 914. In various embodiments, system 300 illustrated in FIG. 3 and system 400 illustrated in FIG. 4 may implement all or a portion of method 900.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electric system from over-frequency conditions. Accordingly, many changes may be made to the details of the above-described embodiments without departing from the underlying principles of this disclosure. The scope of the present invention should, therefore, be determined only by the following claims.

What is claimed is:

1. A system configured to selectively implement a protective action in an electric power system, comprising:
   a data acquisition subsystem configured to receive a plurality of representations of electrical conditions associated with at least a portion of the electric power delivery system;
   an incremental quantities module in communication with the data acquisition subsystem, configured to calculate incremental quantities from the plurality of representations;
   a protective action module in communication with the incremental quantities module, configured to:
   detect an event;
   determine an incremental quantities value during the event;
   determine a time-varying threshold;
   compare the incremental quantities value during the event with the time-varying threshold;
   selectively implement a protective action when the incremental quantities value during the event exceeds the time-varying threshold by a security margin;
   wherein the security margin is scaled by a factor which is a function of current flow and at least one line parameter.

2. The system of claim 1, wherein the incremental quantities value comprises an incremental replica current.

3. The system of claim 1, wherein the time-varying threshold comprises a linear function.

4. The system of claim 1, wherein the incremental quantities value during the event is determined by integrating the incremental quantities value.

5. The system of claim 1, wherein the time-varying threshold is proportionate to a magnitude of an electric current in the portion of the electric power delivery system.

6. The system of claim 1, wherein the protective action module comprises an overcurrent element.

7. The system of claim 1, further comprising a directional module configured to determine if the event is in a forward direction based on a polarity of a voltage and current comprised in the plurality of representations of electrical conditions.

8. The system of claim 1, wherein the protective action module is further configured to compare the incremental quantities value during the event with the time-varying threshold by determining a difference between the time-varying threshold and the incremental quantities value during the event and accumulating the difference.

9. A system configured to selectively implement a protective action in an electric power system, comprising:
- a data acquisition subsystem configured to receive a plurality of representations of electrical conditions associated with at least a portion of the electric power delivery system;
- an incremental quantities module in communication with the data acquisition subsystem, configured to calculate incremental quantities from the plurality of representations;
- a protective action module in communication with the incremental quantities module, configured to:
  - detect an event;
  - determine an incremental quantities value during the event;
  - determine a time-varying threshold;
  - compare the incremental quantities value during the event with the time-varying threshold;
  - selectively implement a protective action when the incremental quantities value during the event exceeds the time-varying threshold by a security margin;

wherein the security margin is determined based on a maximum expected change in the plurality of representations of electrical conditions based on a switching event associated with a capacitor bank on a series-compensated transmission line.

* * * * *